(12) United States Patent
Park et al.

(10) Patent No.: US 8,350,674 B2
(45) Date of Patent: Jan. 8, 2013

(54) RFID TAG INCLUDING A LOOP ANTENNA AND RFID SYSTEM USING THE RFID TAG

(75) Inventors: Il Hwan Park, Hwaseong-si (KR); Chang Su Choi, Yongin-si (KR); Jong Soo Kim, Seoul (KR)

(73) Assignee: LS Industrial Systems Co., Ltd., Anyang-si, Gyeonggi-do (KR)

( * ) Notice: Subject to any disclaimer, the term of this patent is extended or adjusted under 35 U.S.C. 154(b) by 575 days.

(21) Appl. No.: 12/413,177

(22) Filed: Mar. 27, 2009

(65) Prior Publication Data

US 2009/0243805 A1 Oct. 1, 2009

(30) Foreign Application Priority Data

Apr. 1, 2008 (KR) ........................ 10-2008-0030474

(51) Int. Cl.
*H04Q 5/22* (2006.01)

(52) U.S. Cl. ..................... 340/10.1; 340/572.1; 340/505; 340/572.5; 343/741; 343/866

(58) Field of Classification Search ................. 340/10.1, 340/572.1, 505, 572.5; 343/741, 866, 61, 343/761
See application file for complete search history.

(56) References Cited

U.S. PATENT DOCUMENTS

| | | | | |
|---|---|---|---|---|
| 5,914,692 A * | 6/1999 | Bowers et al. | ................. | 343/742 |
| 6,346,922 B1 * | 2/2002 | Proctor et al. | ................. | 343/795 |
| 6,480,110 B2 * | 11/2002 | Lee et al. | ................. | 340/572.5 |
| 6,693,599 B1 * | 2/2004 | Chia et al. | .................... | 343/741 |
| 6,791,457 B2 * | 9/2004 | Shimura | ........................ | 340/448 |
| 6,970,141 B2 * | 11/2005 | Copeland et al. | ............. | 343/866 |
| 7,202,790 B2 * | 4/2007 | Copeland et al. | ........... | 340/572.7 |
| 7,439,933 B2 * | 10/2008 | Uesaka | .......................... | 343/895 |
| 7,446,729 B2 * | 11/2008 | Maruyama et al. | ........... | 343/867 |
| 7,812,729 B2 * | 10/2010 | Copeland | .................... | 340/572.7 |
| 8,022,829 B2 * | 9/2011 | Takeda et al. | .............. | 340/572.8 |
| 8,022,886 B2 * | 9/2011 | Kai et al. | ...................... | 343/797 |
| 8,056,814 B2 * | 11/2011 | Martin et al. | .................. | 235/487 |
| 8,077,115 B2 * | 12/2011 | Yamada et al. | ............... | 343/895 |
| 8,193,873 B2 * | 6/2012 | Kato et al. | ................... | 333/24 R |
| 8,193,938 B2 * | 6/2012 | Halberthal et al. | ......... | 340/572.7 |
| 2005/0231330 A1 * | 10/2005 | Drews et al. | ............. | 340/10.51 |
| 2006/0214798 A1 * | 9/2006 | Wang | .......................... | 340/572.7 |
| 2006/0244676 A1 * | 11/2006 | Uesaka | .......................... | 343/895 |
| 2007/0200708 A1 * | 8/2007 | Hayama et al. | ............ | 340/572.7 |

FOREIGN PATENT DOCUMENTS

| | | |
|---|---|---|
| CN | 1150498 | 5/1997 |
| JP | 2000-077928 | 3/2000 |
| JP | 2005-159858 | 6/2005 |
| JP | 2006-180043 | 7/2006 |
| JP | 2006-211683 | 8/2006 |
| JP | 2006-324766 | 11/2006 |
| JP | 2007-228326 | 9/2007 |
| KR | 1020060093362 | 8/2006 |
| KR | 100767720 | 10/2007 |
| WO | 2007/029296 | 3/2007 |
| WO | 2007/070571 | 6/2007 |

* cited by examiner

*Primary Examiner* — Hoi Lau
(74) *Attorney, Agent, or Firm* — Lee, Hong, Degerman, Kang & Waimey

(57) ABSTRACT

An RFID tag and an RFID tag using the same are disclosed, wherein the RFID tag comprises: a circuit unit arranged on a first part of a board; and a loop type antenna on a second part of the board.

9 Claims, 9 Drawing Sheets

RFID TAG INCLUDING A LOOP ANTENNA AND RFID SYSTEM USING THE RFID TAG

CROSS-REFERENCE TO RELATED APPLICATIONS

This application claims the benefit of earlier filing date and right of priority to Korean patent application number 10-2008-0030474, filed on Apr. 01, 2008, the contents of which are incorporated by reference in their entirety.

BACKGROUND OF THE INVENTION

1. Field of the Invention

The present invention relates to a Radio Frequency Identification, (hereinafter RFID) tag and more particularly, to an RFID tag having an internal antenna.

2. Description of the Related Art

An RFID system generally includes an RFID tag attached on an object, which transmits a wireless signal having intrinsic identification information of itself, and an RFID reader receiving the transmitted wireless signal from the RFID tag and analyzing the signal.

The RFID tag includes a passive RFID tag and an active RFID tag. One of the active RFID tags uses a frequency of 433 MHz. The active RFID tag is used in diversity areas including logistics in harbors, aviation, military, and Ubiquitous Sensor Network. The active RFID tag typically has a helical antenna wound a conducting wire wound in a helical shape.

In a case that an active RFID tag is attached on a front surface or a lateral surface of a large object, e.g., a container, an RFID reader of the conventional RFID system may recognize the active RFID tag. However, in a case that the active RFID is attached on a back side of the large object, the RFID reader of the RFID system may not recognize the RFID tag. Because an electric field generated by the helical antenna in the active RFID tag is hidden by the large object, the RFID reader of the RFID system may not recognize the active RFID tag. That is, the electric field by the helical antenna is hidden by the large object since the helical antenna is a vertically polarized antenna, such that the communication between the RFID reader and RFID tag may not be implemented. Further, in a case that the active RFID tag is attached on the large object, a radiation pattern of the electric field caused by the helical antenna may be distorted. That distortion may decrease efficiency of the RFID system.

SUMMARY OF THE INVENTION

According to some exemplary implementations, there is provided an RFID tag including a radiation pattern and an RFID system using the RFID tag. The RFID tag attached on a large object includes an internal loop antenna of a wavelength. An RFID reader of the RFID system may efficiently detect the RFID tag. According to the RFID tag and the RFID system using the RFID tag, the ability for recognizing the RFID tag may be enhanced without any degradation for performance of the internal antenna in the RFID tag.

In one general aspect of the present disclosure, there is provided an RFID tag, comprising: a circuit unit arranged on a first part of a board; and a loop type antenna on a second part of the board.

In another general aspect of the present disclosure, there is provided an RFID system, comprising: an RFID tag including a circuit unit arranged on a first part of a board, and a loop type antenna on a second part of the board; and an RFID reader sending a signal to the RFID tag and receiving a response signal from the RFID tag to analyze and display the received response signal.

DESCRIPTION OF SPECIFIC EMBODIMENTS

Exemplary implementations of the present disclosure will be described with reference to the accompanying drawings.

Figure 1:
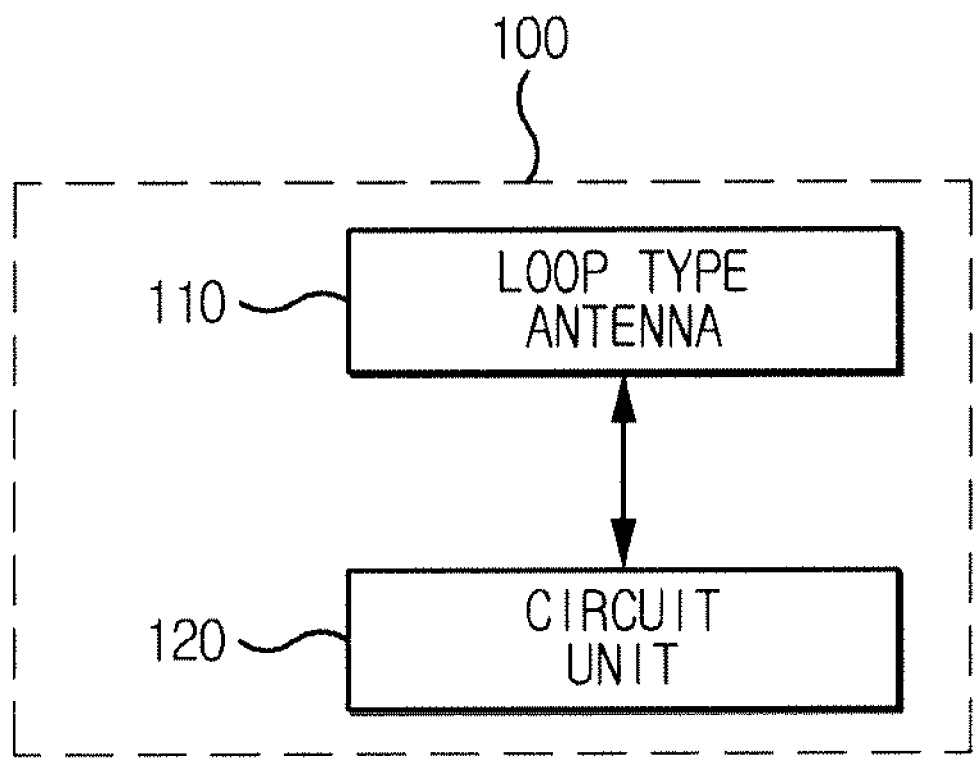
FIG. 1 is a block diagram of an RFID tag of an exemplary implementation according to the present invention.

FIG. 1 is a block diagram of an RFID tag of an exemplary implementation according to the present invention.

The RFID tag 100 includes a loop type antenna 110 on a first part of a board, and a circuit unit 120 arranged on a second part of the board. The loop type antenna 110 receives a signal from an RFID reader that transfer the signal to the circuit unit 120, and send a response signal transferred from the circuit unit 120 to the RFID reader. The circuit unit 120 performs predetermined operations in response to the received signal transferred from the loop type antenna 110.

Figure 2:
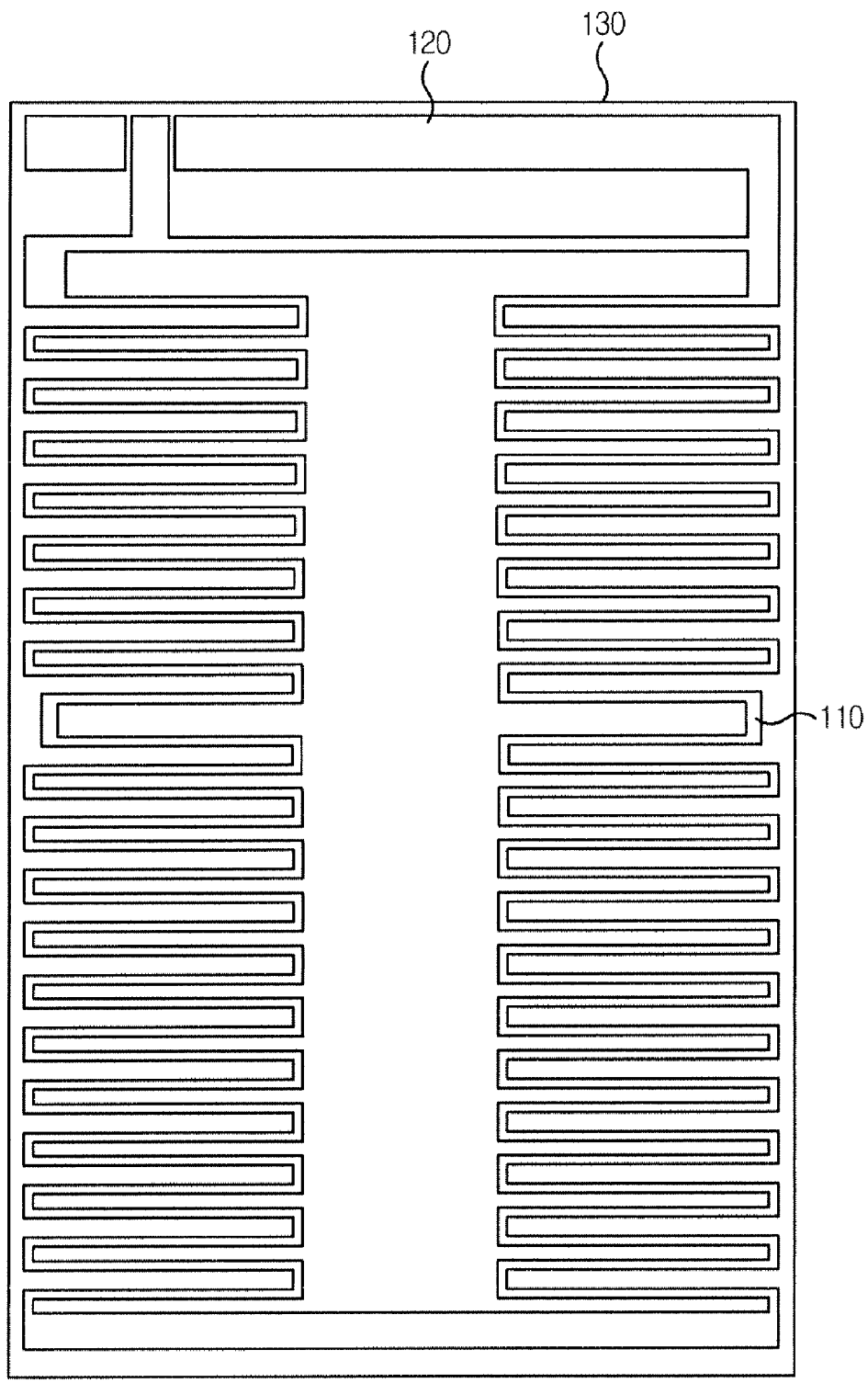
FIG. 2 illustrates an exemplary implementation of an antenna in the RFID tag according to the present invention.

FIG. 2 illustrates an exemplary implementation of an antenna in the RFID tag according to the present invention.

The loop type antenna of FIG. 1 is arranged on the first part of the board in the RFID tag, and may be formed by a printing method. In another exemplary implementation, the loop type antenna of FIG. 1 may be formed with conducting metal plates or may be formed as a surface mounting technology type or a ceramic type. In another exemplary implementation, the loop type antenna of FIG. 1 may be formed by combining a metal object with a structure made by plastic material.

It is characterized that a main radiation pattern of the loop type antenna 110 is arranged to a horizontal direction, not a vertical direction. That is, the loop type antenna 110 is configured to offset a vertical electric field polarization caused by the loop type antenna. The antenna 110 includes a rectangular loop antenna that has a width corresponding to a wavelength of an operating frequency for the RFID tag. The operating frequency may be adjusted depending on adapted cases.

The loop type antenna 110 may be diversely transformed, for example, as a polygonal loop type including a rectangular type, a circular loop or a diamond type.

Figure 3:
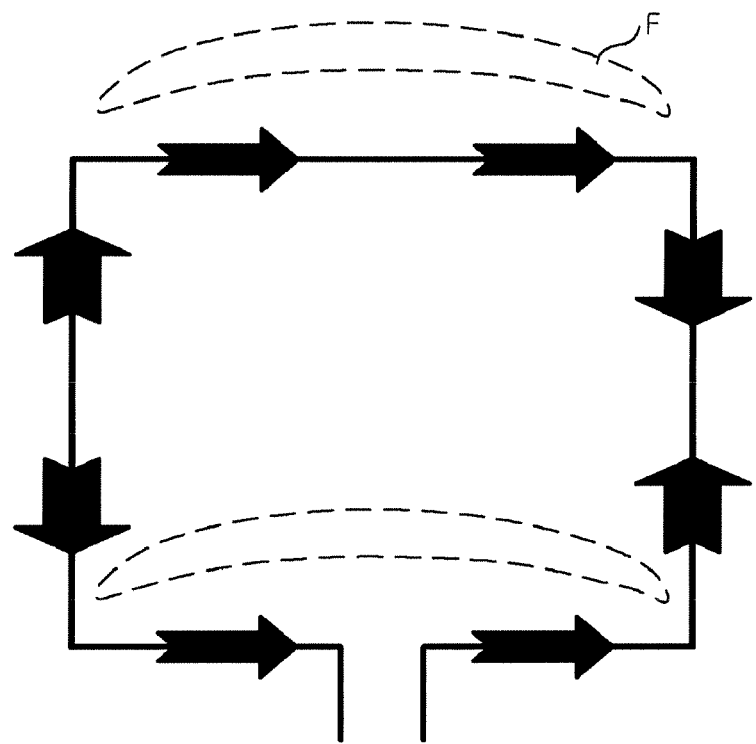
FIG. 3 illustrates current distribution of the antenna in the RFID tag according to the present invention.

FIG. 3 illustrates a current distribution of the antenna in the RFID tag according to the present invention.

The arrows of FIG. 3 represent directions of current distribution in the loop type antenna 110. As shown, a vertical electric field polarization of the loop type antenna 110 is offset, and contrastively, a horizontal electric filed polarization of the loop type antenna constitutes a main radiation pattern of the loop type antenna 110. The reference denotation 'F' in FIG. 3 means a electric field of the loop type antenna 110.

Figure 4A:
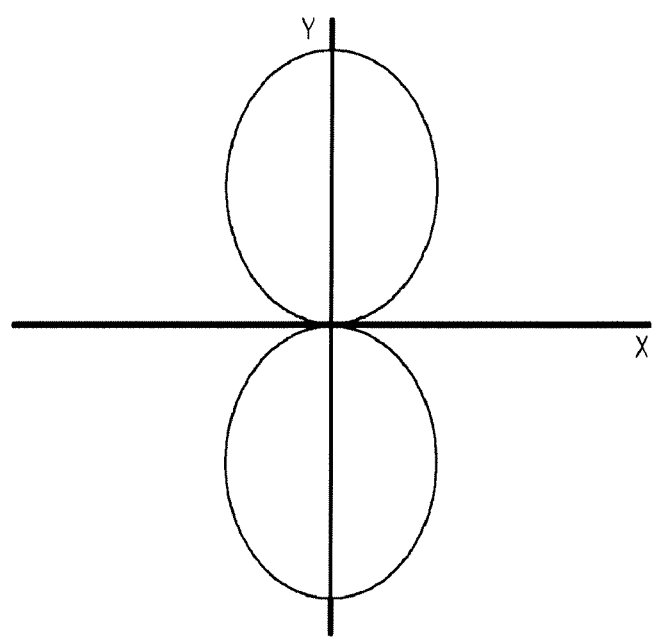
FIG. 4A and FIG. 4B show an electric field by the antenna in FIG. 3.
Figure 4B:
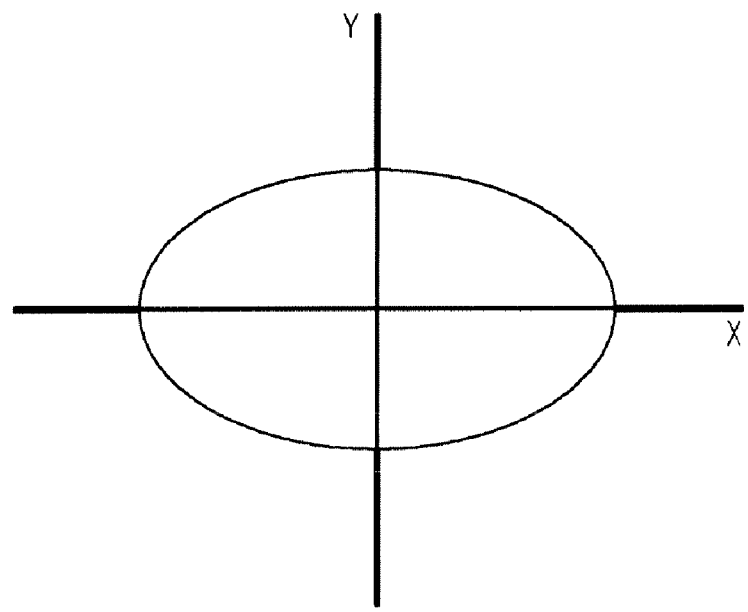

FIG. 4A and FIG. 4B show an electric field created by the antenna in FIG. 3.

FIG. 4A shows a vertical electric field polarization of the loop type antenna 110. FIG. 4B shows a horizontal electric field polarization of the loop type antenna 110. Each X axis of FIG. 4A and FIG. 4B corresponds to a direction of horizontal current in FIG. 3. Each Y axis of FIG. 4A and FIG. 4B corresponds to a direction of vertical current in FIG. 3.

In view of another aspect of the figures, FIG. 4A and FIG. 4B show an electric field created by the electric field propagation of the reference denotation 'F' in FIG. 3. As shown in FIG. 4A, the characteristics of the vertical radiation pattern is that the upper part and the bottom part are symmetrized in reference to the X axis, thereby offsetting each other. As shown in FIG. 4B, the horizontal radiation pattern graphically forms an oval shape in reference to the origin. The oval shape functions as the main radiation pattern of the loop type antenna 110.

Since the loop type antenna has the radiation pattern as explained above, in a case that the RFID tag including the loop type antenna is attached on a relatively large object, an RFID reader can reliably receive a signal regardless of where the RFID tag is attached on the large object. That is, the RFID tag and the RFID reader may communicate each other regardless of an attached location of the RFID tag in the large object.

The intensity of the electric field caused by the loop type may be adjusted by users depending on adapted situations of the RFID tag.

Figure 5:
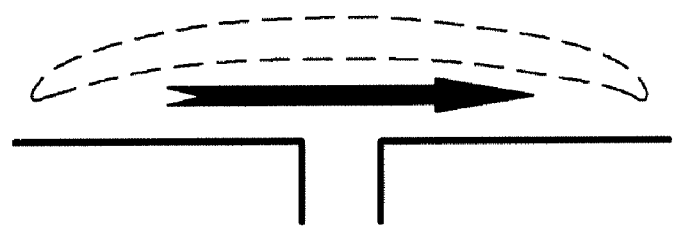
FIG. 5 shows an electric field of the antenna in the RFID tag when the antenna in the RFID tag according to the present invention is a dipole antenna.
Figure 5:
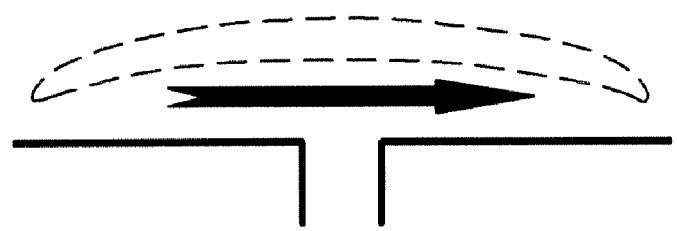

FIG. 5 shows an electric field of the antenna in the RFID tag when the antenna in the RFID tag according to the present invention is a dipole antenna.

As shown, the loop type antenna 110 may include a plurality of dipole antennas arranged in parallel. When the loop type antenna is configured by the plurality of dipole antennas, the characteristics of the vertical radiation pattern and the horizontal radiation pattern of the antenna may respectively correspond to these of FIG. 4A and FIG. 4B.

The loop type antenna 110 may use meander lines. If the loop type antenna 110 includes a coil having a plurality of meander lines, the whole circumference of the antenna may be reduced.

Figure 6:
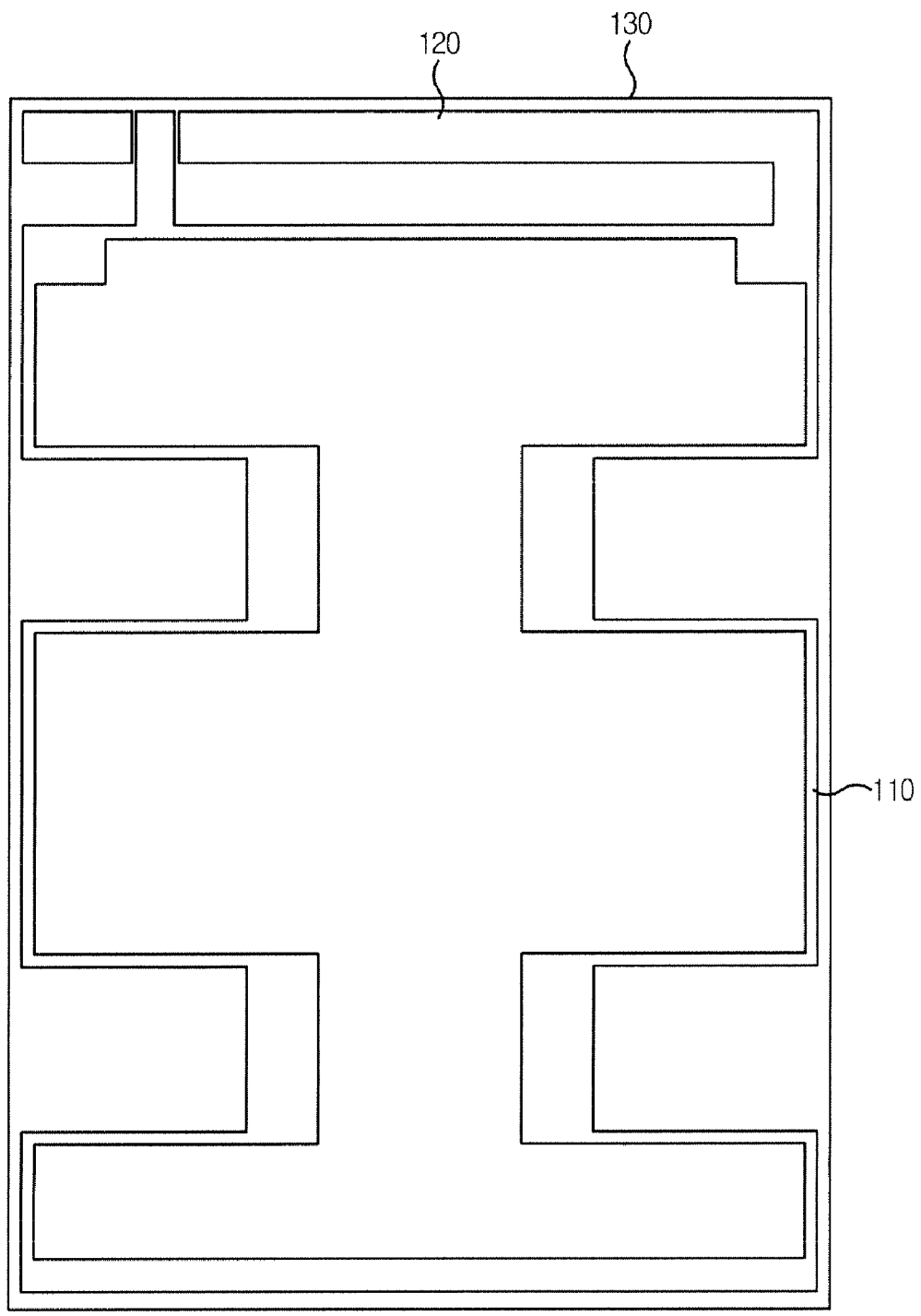
FIG. 6 and FIG. 7 illustrate another exemplary implementation of an antenna in an RFID tag according to the present invention.
Figure 7:
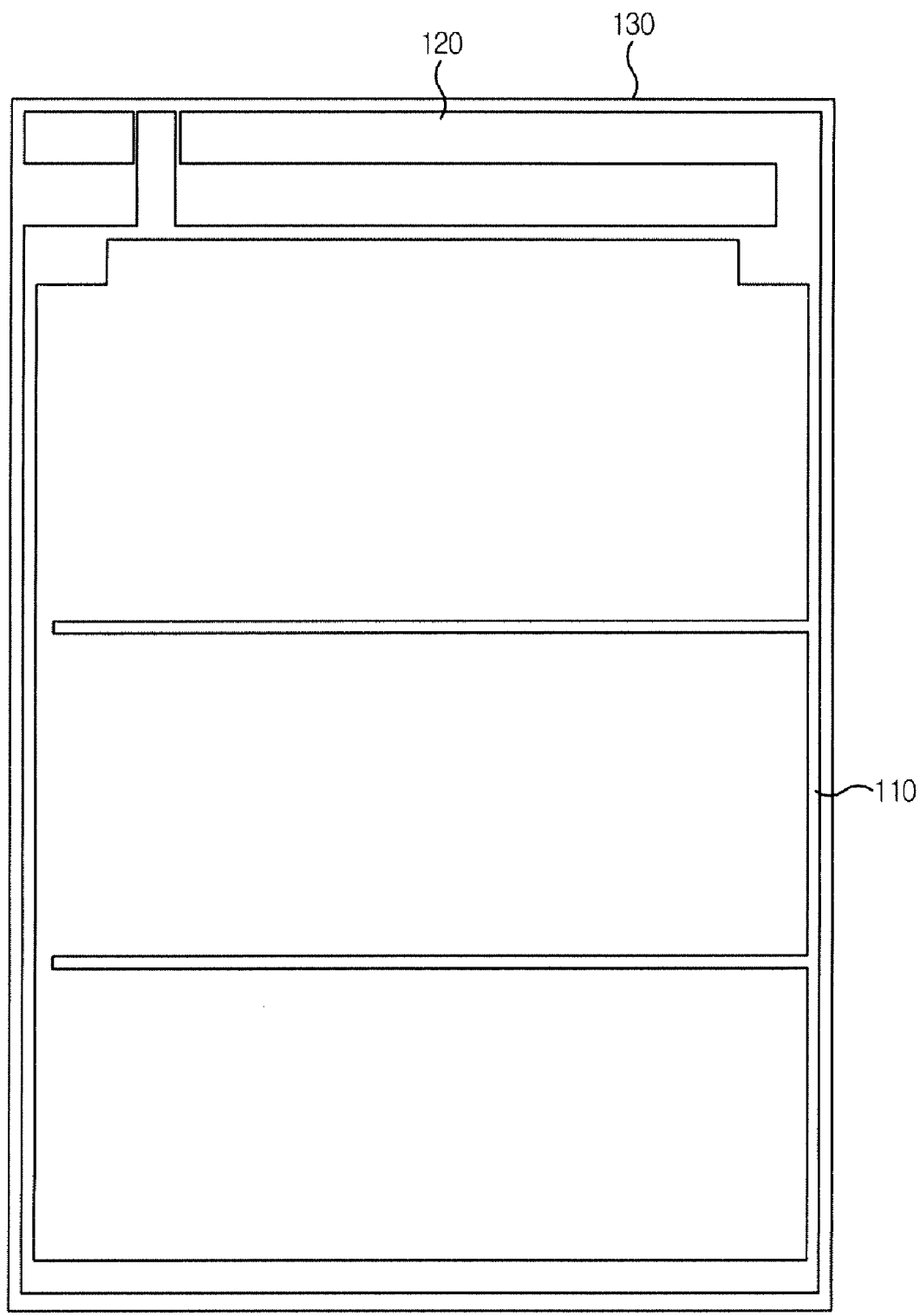

FIG. 2 illustrates one example of the loop type antenna 110 configured by using meander lines. FIG. 6 and FIG. 7 respectively illustrate another examples of the loop type antenna 110 configured by using meander lines. As shown in FIG. 2, FIG. 6 and FIG. 7, the number of meander lines and the configuration of coil in the loop type antenna may be adjusted depending on adapted cases. there is a further benefit that if the loop type antenna 110 includes meander lines, the loop type antenna 110 of the RFID tag may be formed as an internal antenna.

The loop type antenna 110 may be adapted to an active RFID tag using 433 MHz as a main operation frequency. The loop type antenna 110 antenna may include one selected from the group consisting of an inverted an F-type antenna, a monopole antenna, a microstrip antenna, and an array antenna. All of these antennas may be realized as an internal antenna.

The loop type antenna 110 receives a signal transmitted or radiated from the RFID reader. The circuit unit 120 is arranged on the board, e.g. a printed circuited board, included in the RFID tag 100 and connected to the loop type antenna 110. The circuit unit 120 implements predetermined operations of the RFID according to the signal transmitted or radiated from the RFID reader. That is, the circuit unit 120 processes data about identification information of the RFID tag in response to a reception signal through the internal antenna, and transmits a response signal having identification information to the RFID reader through the internal antenna.

The RFID tag 100 includes the loop type antenna 110 and the circuit unit 120, and is formed in one chip. The RFID tag 100 may be so formed as to be easily attached to or detached from a target object.

The loop type antenna 10 and the circuit unit 120 may be formed on a same surface of a board in the RFID tag. Also, the loop type antenna 110 and the circuit unit 120 may be formed on a different surface of the board. That is, the loop type antenna 110 is arranged on one side of the board and the circuit unit 120 is arranged on the other of the board.

Figure 8:
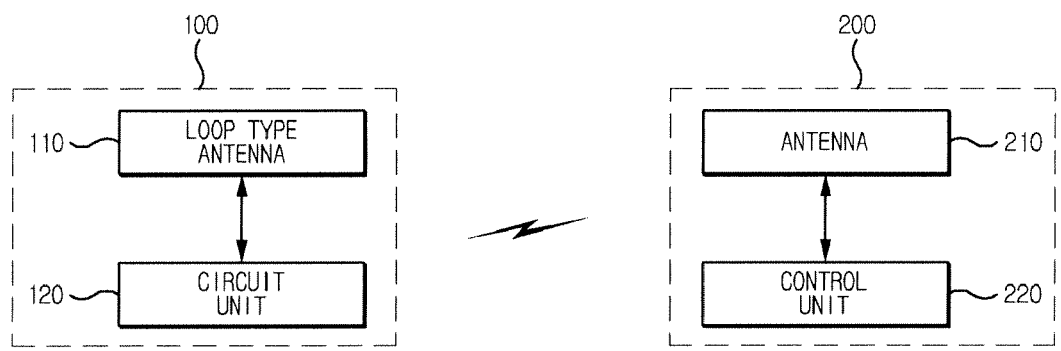
FIG. 8 is an exemplary implementation of an RFID system according to the present invention.

FIG. 8 is an exemplary implementation of an RFID system according to the present invention.

As shown, the RFID system includes an RFID tag 100 attached on an object that transmits identification information of the object, and an RFID reader 200 including at least one antenna. The RFID tag 100 includes a loop type antenna 110 on a first part of a board and a circuit unit 120 arranged on a second part of the board.

The loop type antenna 110 includes an antenna having a plurality of meander lines, an inverted an F-type antenna, a monopole antenna, a microstrip antenna, or an array antenna.

Since the loop type antenna has the plurality of meander lines, in a case that the RFID tag including the loop type antenna is attached on a relatively large object, e.g., a container, the radiation pattern generated by the loop type antenna may be arranged over the container. Thus, even though the RFID tag including the loop type antenna is attached on a relatively large object or on the RFID reader 200 is attached to any one, the RFID reader may reliably receive a response signal from the RFID.

Figure 9A:
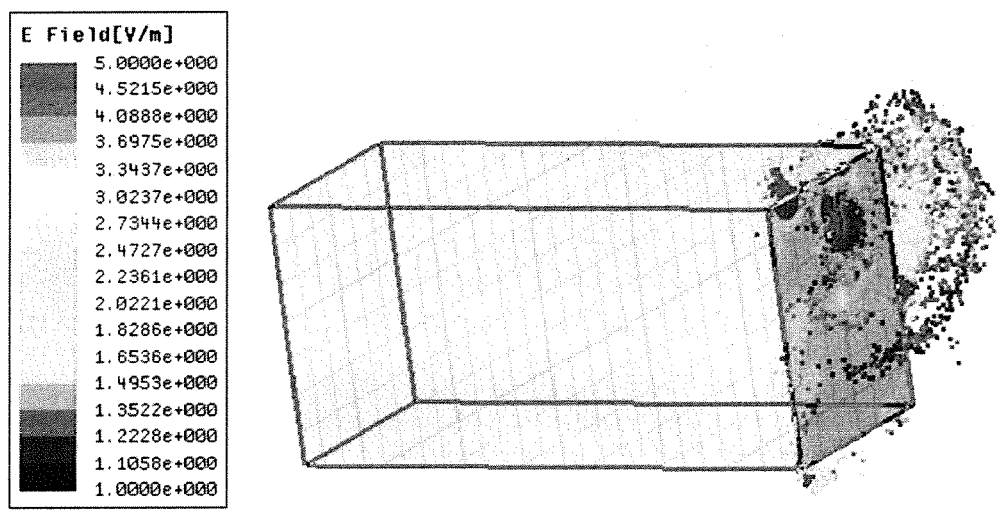
FIGS. 9A to 9C show simulations of an electric field created by the antenna of the RFID tag according to the present invention.
Figure 9B:
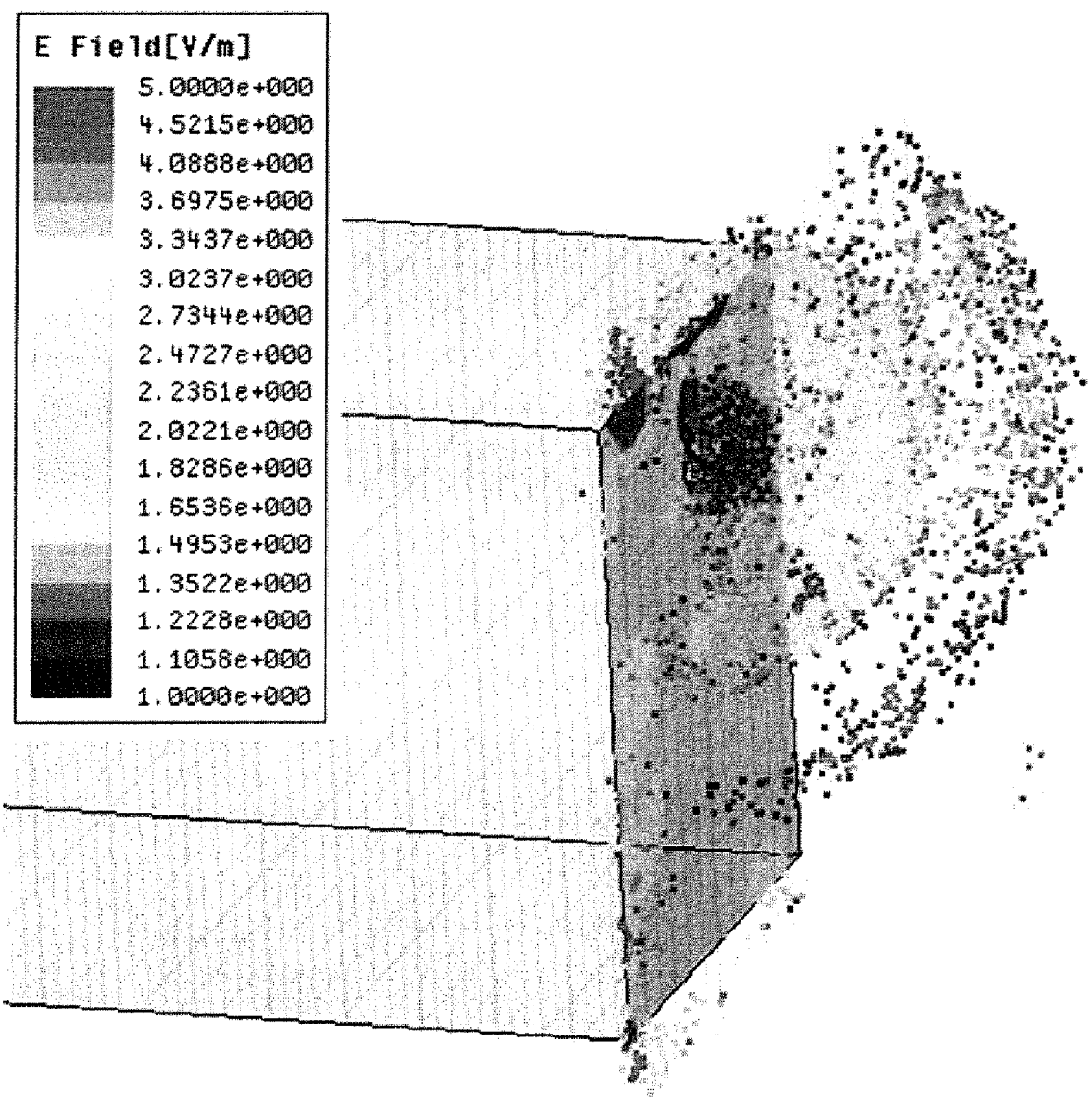
Figure 9C:
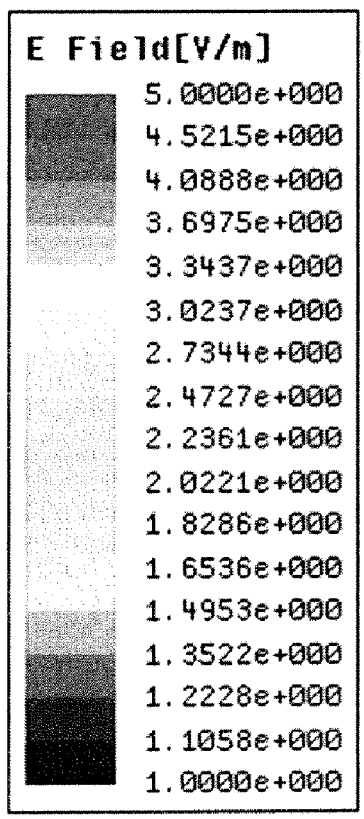
Figure 9C:
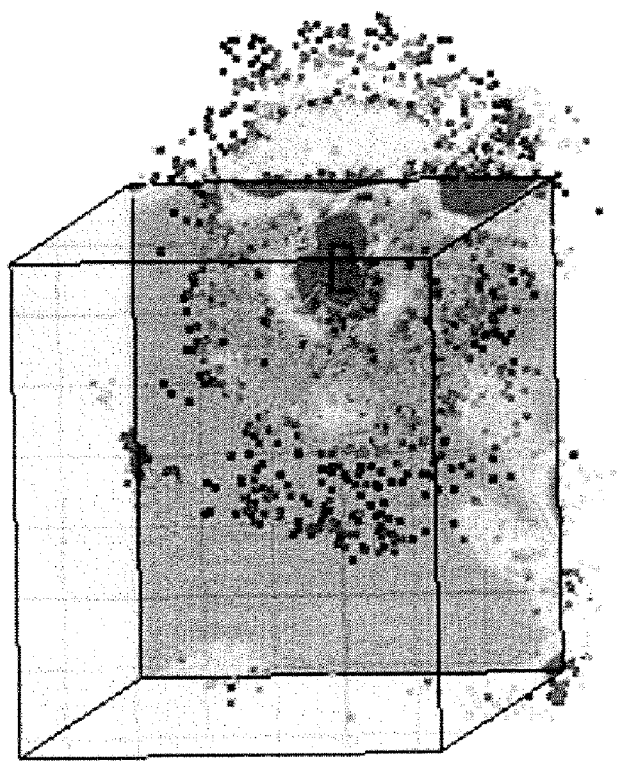

FIGS. 9A to 9C respectively show simulations of an electric field generated by the loop type antenna of the RFID tag according to the present invention when the RFID tag including the loop type antenna is attached on a relatively large object such as a container.

FIGS. 9A and 9B depict distribution of a electric field created by antenna of the RFID tag seen from a lateral side of the container. FIG. 9C depict the distribution of electric field seen from of a back side of the container. The radiation pattern generated by the loop type antenna is larger than the container size-wise. Thus, the RFID reader may reliably receive a response signal from the RFID regardless of a place on which the RFID reader is arranged.

The loop type antenna 110 may be configured as an internal antenna. The RFID reader 200 includes an antenna part 210 including at least one antenna that transmits a signal to an RFID tag or receives a response signal from the RFID tag, and a control unit 220 transmitting or radiating the signal to the RFID tag through the antenna part 210 and analyzing the response signal from the RFID tag. The antenna part receives the signal transmitted by the RFID tag. The number and position of the antennas included in the antenna part depend on an operation frequency of the RFID tag, an operation environment, or ability of the FRID system. The antenna part 210 may be so configured as to receive signals of various frequencies. The antenna part 210 and the control unit 220 may be implemented in one part or in two parts. The control unit 220 generates a wake-up signal in order to start an operation of the RFID tag, and transmits the wake-up signal to the RFID tag through the antenna part 210.

The control unit 220 exchanges the wake-up signal with the RFID tag 100 using a half duplex communication method or a full duplex communication method. The control unit 220 communicates with the RFID tag using one selected from the group consisting of Amplitude-Shift Keying, Frequency-Shift Keying, and Phase-Shift Keying.

If the RFID tag transmits a response signal having intrinsic identification information in response to the wake-up signal, the control unit 220 receives the response signal from the RFID tag 100. Then, the control unit 220 analyzes the identification information of the response signal, thereby performing corresponding control operation in response to a result that analyzed, finally displaying the analyzed result or sending the analyzed result to an external server system (not shown). The external server system generates a control signal based on the analyzed result and carries out an operation in response to the control signal. Also, the external server system may control the RFID tag using the control signal.

As described above, an RFID tag including an internal antenna and an RFID system using the same use a loop type antenna as an internal antenna of the RFID tag according to the present invention. The loop type antenna has a specialized radiation pattern. Although the RFID tag is attached on a large object, an RFID reader of the RFID system arranged at a certain point may reliably communicate with the RFID because of the specialized radiation pattern. That is, in the RFID system, the ability for recognizing the RFID tag can be expectedly enhanced.

While the present invention has been described with respect to the specific embodiments, it will be apparent to those skilled in the art that various changes and modifications may be made without departing from the spirit and scope of the invention as defined in the following claims.

What is claimed is:

1. A Radio Frequency Identification (RFID) tag comprising:
   a circuit unit arranged on a first part of a board; and
   a loop type antenna arranged on a second part of the board,
   wherein the loop type antenna comprises a rectangular loop antenna having a width of one wavelength of an operating frequency,
   wherein the rectangular loop antenna comprises two vertical sides, two horizontal sides and at least one portion,
   wherein a periphery of the rectangular loop antenna is fully defined by the two vertical sides and the two horizontal sides, and
   wherein the at least one portion extends generally parallel to each of the two horizontal sides and extends from only one of the two vertical sides.

2. The RFID tag of claim 1, wherein the circuit unit is for transmitting, via the loop type antenna, a response signal including identification information of the circuit unit to an RFID reader in response to a reception signal.

3. A Radio Frequency Identification (RFID) system comprising:
   an RFID tag including a circuit unit arranged on a first part of a board and a loop type antenna arranged on a second part of the board; and
   an RFID reader for transmitting a signal to the RFID tag, receiving a response signal from the RFID tag, and analyzing and displaying the response signal,
   wherein the loop type antenna comprises a rectangular loop antenna having a width of one wavelength of an operating frequency,
   wherein the rectangular loop antenna comprises two vertical sides, two horizontal sides and at least one portion,
   wherein a periphery of the rectangular loop antenna is fully defined by the two vertical sides and the two horizontal sides, and
   wherein the at least one portion extends generally parallel to each of the two horizontal sides and extends from only one of the two vertical sides.

4. The RFID system of claim 3, wherein the circuit unit is for transmitting, via the loop type antenna, the response signal including identification information of the circuit unit to the RFID reader in response to a reception signal.

5. The RFID system of claim 3, wherein the RFID tag is an active RFID tag.

6. The RFID system of claim 3, wherein the RFID reader includes:
   an antenna part including at least one antenna; and
   a control unit for controlling the antenna part to transmit the signal to the RFID tag and analyzing the response signal from the RFID tag.

7. The RFID system of claim 6, wherein the control unit is further for generating a wake-up signal in order to start an operation of the RFID tag and transmitting the wake-up signal to the RFID tag through the antenna part.

8. The RFID system of claim 7, wherein the RFID tag is for transmitting the response signal to the RFID reader in response to the wake-up signal.

9. The RFID system of claim 7, wherein the control unit is further for analyzing identification information in the response signal from the RFID tag, displaying a result of the analyzing and sending the result to an external server system.

* * * * *